United States Patent
Merry et al.

(10) Patent No.: US 8,127,048 B1
(45) Date of Patent: *Feb. 28, 2012

(54) SYSTEMS AND METHODS FOR SEGMENTING AND PROTECTING A STORAGE SUBSYSTEM

(75) Inventors: David E. Merry, Bondsville, MA (US); Mark S. Diggs, Laguna Hills, CA (US); Gary A. Drossel, Laguna Niguel, CA (US); Michael J. Hajeck, San Juan Capistrano, CA (US)

(73) Assignee: SiliconSystems, Inc., Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/052,017

(22) Filed: Mar. 18, 2011

Related U.S. Application Data

(63) Continuation of application No. 12/409,174, filed on Mar. 23, 2009, now Pat. No. 7,912,991, which is a continuation of application No. 11/480,303, filed on Jun. 30, 2006, now Pat. No. 7,509,441.

(51) Int. Cl.
*G06F 3/00* (2006.01)
*G06F 13/00* (2006.01)

(52) U.S. Cl. .............. 710/8; 710/36; 711/163; 711/170

(58) Field of Classification Search ................ 710/8–14, 710/36–44; 711/152–167, 170–173, 115–118, 711/140

See application file for complete search history.

(56) References Cited

U.S. PATENT DOCUMENTS

| 7,509,441 B1 * | 3/2009 | Merry et al. ................ 710/8 |
| 7,912,991 B1 * | 3/2011 | Merry et al. ................ 710/8 |

* cited by examiner

*Primary Examiner* — Christopher B Shin
(74) *Attorney, Agent, or Firm* — Knobbe Martens Olson & Bear LLP

(57) ABSTRACT

A storage subsystem comprises a set of zone definitions that uses physical block addresses to divide a memory array in the storage subsystem into zones or segments. A set of zone parameters defines user access modes and security levels for each of the segments. Defining zones for the memory array provide flexibility and increased protection for data stored in the memory array. For example, data of one zone can be quickly erased without affecting data stored in other zones and critical data can be stored in read-only zones to prevent inadvertent overwrite.

20 Claims, 4 Drawing Sheets

| Byte Numbers | Data |
|---|---|
| 0 to 3 | Zone 1 Beginning PBA |
| 4 to 7 | Zone 1 Ending PBA |
| 8 to 31 | 00h |
| 32 to 35 | Zone 2 Beginning PBA |
| 36 to 39 | Zone 2 Ending PBA |
| 40 to 63 | 00h |
| 64 to 67 | Zone 3 Beginning PBA |
| 68 to 71 | Zone 3 Ending PBA |
| 72 to 95 | 00h |
| 96 to 99 | Zone 4 Beginning PBA |
| 100 to 103 | Zone 4 Ending PBA |
| 104 to 127 | 00h |
| 128 to 131 | Zone 5 Beginning PBA |
| 132 to 135 | Zone 5 Ending PBA |
| 136 to 511 | 00h |

FIG. 4

SYSTEMS AND METHODS FOR SEGMENTING AND PROTECTING A STORAGE SUBSYSTEM

RELATED APPLICATIONS

This application is a continuation of U.S. application Ser. No. 12/409,174, filed on Mar. 23, 2009, now U.S. Pat. No. 7,912,991, which is a continuation of U.S. application Ser. No. 11/480,303, filed on Jun. 30, 2006, now U.S. Pat. No. 7,509,441, which is related to U.S. application Ser. No. 11/480,276, filed on Jun. 30, 2006, now U.S. Pat. No. 7,447,807. The present application incorporates the foregoing disclosures herein by reference.

BACKGROUND OF THE INVENTION

1. Field of the Invention

The present invention relates to a storage subsystem such as, for example, a solid-state storage device. More specifically, the present invention relates to systems and methods for segmenting a storage array on the storage subsystem and assigning different characteristics to each segment.

2. Description of the Related Art

Solid-state storage solutions are used to store a wide variety of data. With increasing memory capacity, a mixture of information (e.g., program files, setup files, user data, etc.) can be conveniently stored on a single solid-state storage subsystem such as an advanced technology attachment (ATA) flash disk or a removable flash memory card. The mixture of information may include sensitive information not intended for unauthorized users. For example, a host computer system may store a person's personal or financial information on a solid-state storage subsystem that stores other types of data, applications or programs. Current available technology, such as simple password features or read/write access controls, works at an overall storage subsystem level. That is, a password or read/write restriction applies to an entire solid-state storage subsystem. Different parts of a single solid-state storage subsystem typically cannot be given different levels of protection or access control. In addition, vendor-specific commands (e.g., an ultra-fast data erasure command) typically cannot be implemented for only parts of a solid-state storage subsystem.

SUMMARY OF THE INVENTION

Thus, it would be advantageous to develop a technique and system for segmenting a storage subsystem into multiple segments (or zones) such that a separate set of security or access parameters can be associated with each zone and each zone can implement different vendor-specific commands.

In one embodiment, a storage array on a storage subsystem (e.g., a memory array on a flash memory card or a non-volatile, solid-state storage subsystem) is segmented by storing a set of segment definitions (e.g., size and location of each segment) in a first storage location on the storage subsystem. The size and location of each segment can be defined by physical block address (PBA), logical block address (LBA), cylinder-head-sector (CHS) address or other similar methods. Each segment can be associated with a separate set of segment parameters defined and stored on a second storage location in the storage subsystem. The segment parameters may relate to user access levels (e.g., read or write access control) or security features (e.g., password). The parameters (or properties) for one segment can advantageously be set or modified independently of properties for another segment. Furthermore, vendor-specific commands (e.g., specific security commands), wear leveling, error correction, redundancy and similar storage algorithms can be implemented for specific segments or on a zone-by-zone basis.

The first storage location for segment definitions and the second storage location for segment parameters can be separate locations or combined in a common location. In one embodiment, the segment definitions and parameters are implemented within the storage subsystem but are stored outside of user data space. In various embodiments, the first or the second storage location can be registers, part of other components in the storage subsystem (e.g., a controller), part of the memory array (e.g., similar to a Master Boot Record), or a dedicated storage location separate from the memory array or other components in the storage subsystem. In one embodiment, the segment definitions and parameters are accessible (e.g., changeable or erasable) via custom ATA commands and are not affected by operating system or file commands, such as commands that erase contents of a storage subsystem.

In one embodiment, the storage subsystem determines whether access to a particular area of the memory array is consistent with defined segment parameters. For example, a controller in the storage subsystem reads the segment definitions and the associated segment parameters to control access to the memory array. In another embodiment, a host system using the storage subsystem determines whether access to a particular area of the memory array on the storage subsystem is consistent with defined segment parameters. For example, the host system reads the segment definitions and the associated segment parameters and a controller in the host system determines whether access to the memory array is consistent with the defined segments and associated parameters.

In one embodiment, physical or logical storage segments (or zones) correspond to non-overlapping sections of the memory array. In one embodiment, the storage subsystem is configured to support a predefined number of zones (e.g., five zones) and a user defines the zone sizes by specifying a starting PBA (or LBA) and an ending PBA (or LBA) for each of the zones. A predetermined address or word can be used as the starting PBA or the ending PBA to indicate an unused zone. Portions of the memory array that do not belong to any zone are available to the host system as unrestricted memory.

A host system can use a standard disk drive protocol command to specify segment (or zone) definitions (e.g., by providing a plurality of PBAs or LBAs) during an initial setup. In one embodiment, one of the zones is a Master Boot Record (MBR) that allows the host system to define one or more zones based on partition information stored in the MBR. For example, the host system can define zones to match the partition information (such as a string of PBAs or LBAs) read from the MBR. In another embodiment, one of the zones is a master zone (or Zone 0) that allows the host system to initiate a reconfiguration of one or more selected zones by expanding the master zone (e.g., by redefining the location or size of the master zone) to include the selected zones. The reconfiguration effectively replaces zone parameters originally associated with the selected zones with zone parameters associated with the master zone. In one embodiment, the reconfiguration does not affect any data that may be stored in the selected zones. Data or programs are generally not stored in the master zone.

In one embodiment, the storage subsystem (e.g., a detachable device such as a USB drive, PCMCIA card or similar device) is used in a gaming machine with a program stored in a first storage segment that allows read-only access during normal operations and player tracking information stored in a second storage segment that allows write access. In one embodiment, validation codes for various gaming regulatory agencies are stored in a third storage segment that is protected by password. Other applications using a segmented storage subsystem include a military data recorder with setup files stored in a first storage segment and classified mission data stored in a second storage segment that advantageously allows read-only access, does not allow read/write access, or can be erased using a single vendor-specific command.

While the invention may be described in various embodiments with reference to a solid-state storage subsystem (such as a non-volatile memory card or drive), it is intended that the invention also applies to other types of storage subsystems (such as hard disk drives or hybrid disk drives). Neither this summary nor the following detailed description purports to define the invention. The invention is defined by the claims.

BRIEF DESCRIPTION OF THE DRAWINGS

A preferred embodiment of the invention will now be described with reference to the drawings summarized below, which are intended to illustrate, and not limit the present invention.

FIG. 4 illustrates an exemplary data structure for zone definitions using physical block addresses.

DETAILED DESCRIPTION OF THE PREFERRED EMBODIMENT

A solid-state storage subsystem, and associated processes that may be implemented by a host computer, will now be described with reference to the drawings. This description is intended to illustrate a preferred embodiment of the invention, and not limit the invention. The invention is defined by the claims.

Figure 1:
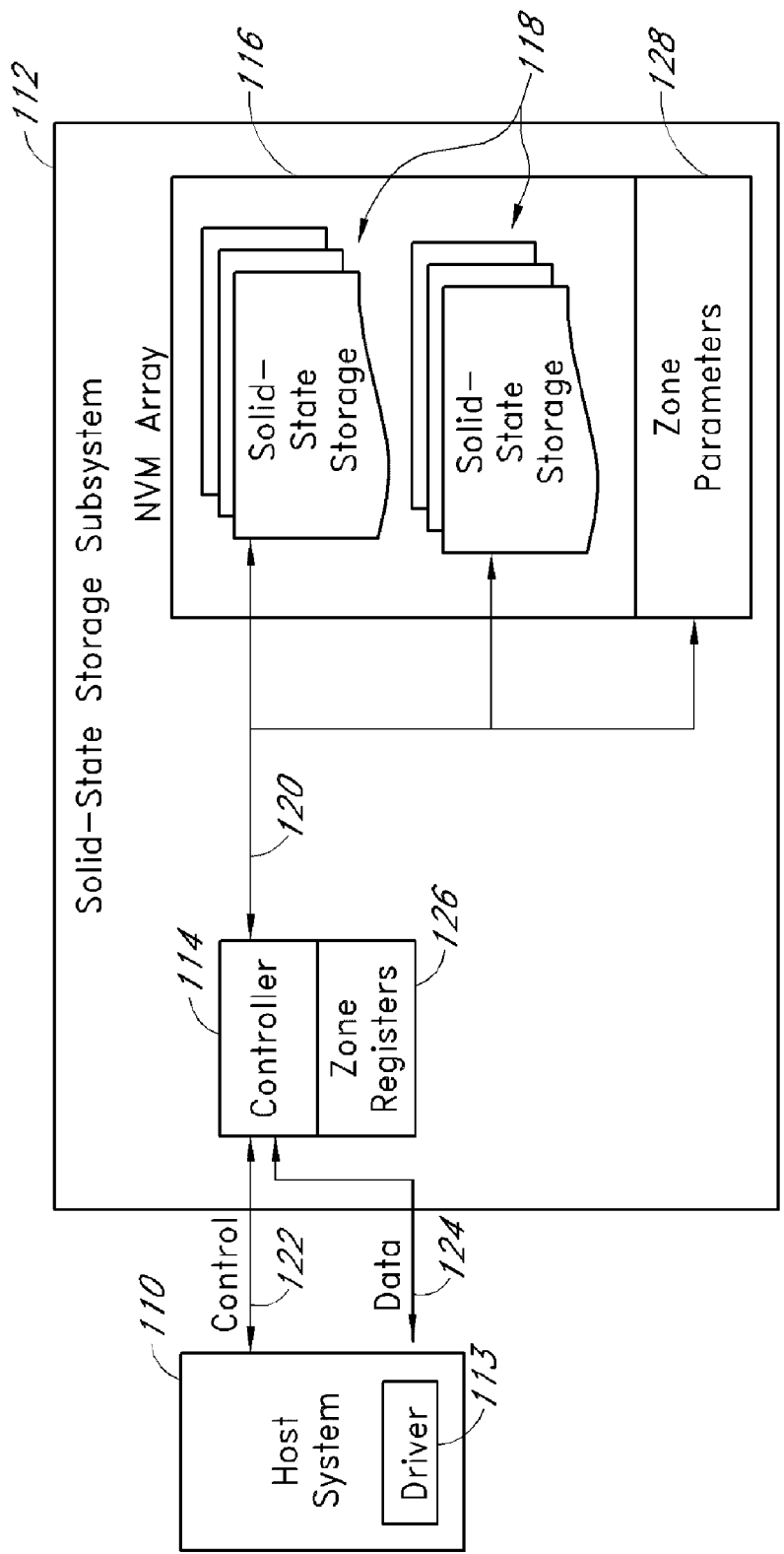
FIG. 1 is a block diagram illustrating a host system linked to a storage subsystem according to one embodiment of the invention.

FIG. 1 is a block diagram illustrating a host system 110 coupled to a solid-state storage subsystem (e.g., a memory storage device) 112 according to one embodiment of the invention. The host system 110 comprises a computer such as a personal computer, workstation, router, blade server or other type of computing device. For example, the host system 110 may be a military system, a flight computer or other flight avionics system, a wearable computer used for military operations, a high-speed data recorder, a medical device, an industrial control system, an interactive kiosk, a personal digital assistant, a laptop computer, an interactive wireless communication device, a point-of-sale device, or the like.

In one embodiment, the interface between the host system 110 and the solid-state storage subsystem 112 includes control lines 122 and data lines 124 for transferring data. For example, the host system 110 stores data on the solid-state storage subsystem 112 that may provide operating system functionality and a boot process for the host system 110. The host system 110 executes a driver or an application 113 that provides functionality for communicating with the solid-state storage subsystem 112, such as by issuing commands in accordance with an ATA or other standard. The solid-state storage subsystem 112 may be in the form of a detachable device, and may communicate with the host system 110 wirelessly or via an industry standard bus such as PCMCIA, USB, Firewire (IEEE-1394), FibreChannel, PCI Express bus, SCSI, PMC, AMC, ATCA, CompactPCI, VME, PC/104 or any other bus-based architecture. The solid-state storage subsystem 112 may also receive its power from the host system 110.

The invention may be embodied within a variety of different types of storage subsystems, including but not limited to non-volatile solid-state memory cards (such as but not limited to those that comply with the CompactFlash, PCMCIA, SmartMedia, MultiMediaCard, MMC micro, SecureDigital, miniSD, microSD, External Memory Device, ATA/ATAPI, SATA, Memory Stick and other card specifications), volatile and non-volatile solid-state storage products in disk drive form factors, electro-mechanical disk drives, and volatile and non-volatile solid-state storage products in a variety of industry standard and custom form factors. By way of example, FIG. 1 shows the solid-state storage subsystem 112 comprising a controller 114 and a non-volatile memory (NVM) array 116. The NVM array 116 may, but need not, be implemented using a plurality of memory circuits 118 such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., MLC, SLC or OTP), NOR memory, AND memory, EEPROM, Ferroelectric Memory (FeRAM), or other discrete NVM chips.

In one embodiment, portions of the NVM array 116 used for storing user data (e.g., user data space or data storage space) can be divided into multiple physical segments (or zones) with separate access control and/or security control for each zone. For example, the solid-state storage subsystem 112 includes a set of zone definitions for keeping track of the physical segments and a set of zone parameters that defines the access control and/or security control features for each zone. In the embodiment shown in FIG. 1, the set of zone definitions is stored on zone registers 126 that are part of the controller 114 while the set of zone parameters is stored on a non-volatile storage 128 that is part of the NVM array 116 but is outside the user data space. In other embodiments, the set of zone definitions can be stored on a part of the NVM array 116 that is also outside the user data space. The set of zone parameters can be stored on a part of the controller 114. In alternate embodiments, the set of zone definitions and the set of zone parameters can be stored on non-volatile storage memories that are separate from the controller 114 or the NVM array 116.

As is conventional, the controller 114 is configured (typically via firmware) to write data to, and read data from, the NVM array 116 via NVM or memory control signals 120 in response to commands from the host system 110. The controller 114 also has access to the zone definitions and the zone parameters. The controller 114 may be implemented using one or more of the following: an application-specific integrated circuit (ASIC), a processor or other substrate configuration, program logic and/or software which operate as described herein or similar thereto. The controller 114 may also comprise controller circuitry, processor circuitry, general purpose single-chip or multi-chip microprocessors, digital signal processors, embedded microprocessors, microcontrollers, combinations of the foregoing, or the like.

In one embodiment, the controller 114 provides the zone definitions and the zone parameters to the host system 110, and the host system 110 determines whether access to particular locations of the NVM array 116 is consistent with the zone definitions and the zone parameters. In another embodiment, the controller 114 includes an algorithm or firmware that determines whether access to specific locations of the NVM array 116 is permitted based on the zone definitions and the zone parameters.

Figure 2:
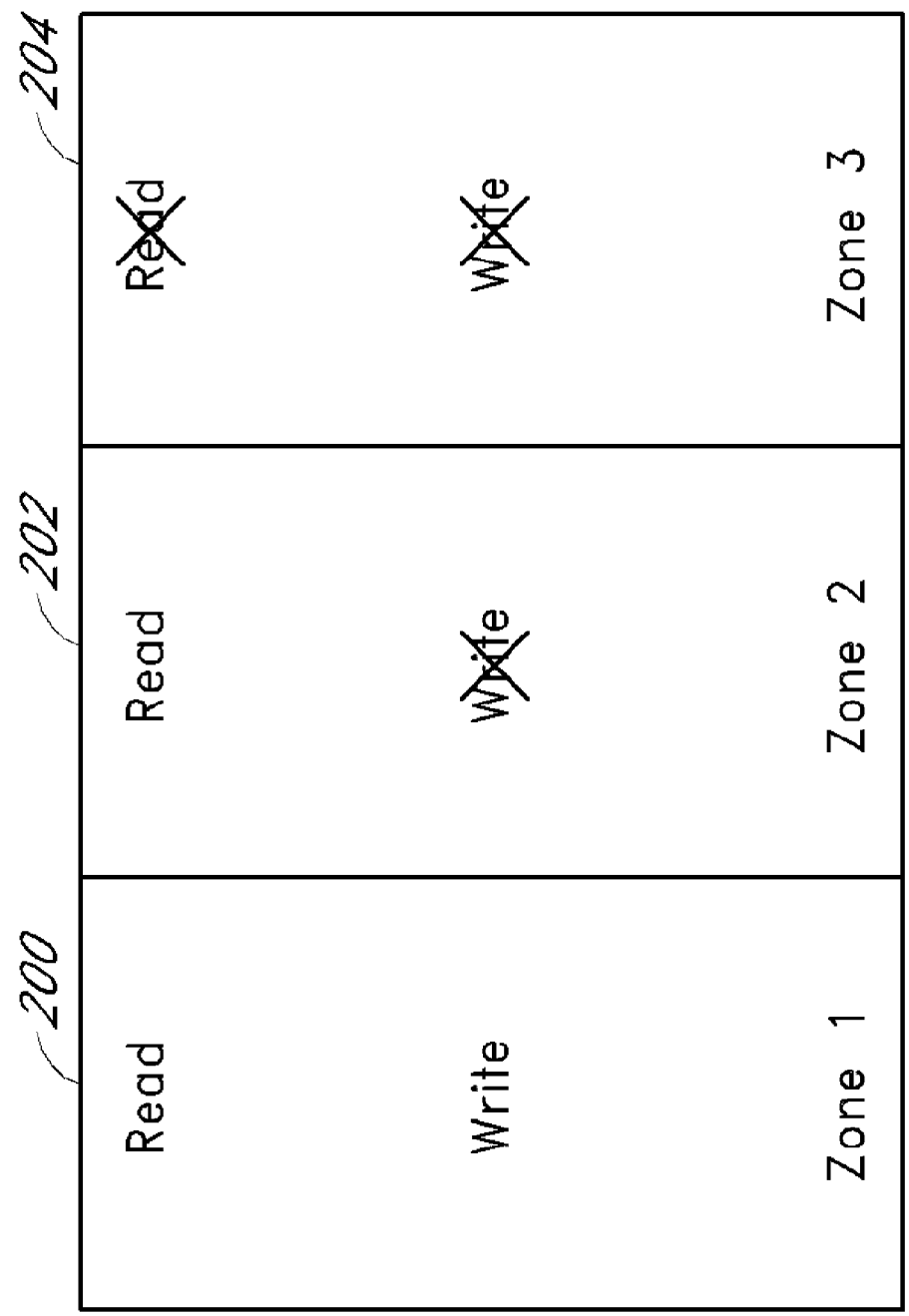
FIG. 2 illustrates an example of data zones with different security parameters.

FIG. 2 illustrates an example of data zones with different access or security parameters for each zone (or physical segment). For example, a user can read and write to a first zone (Zone 1) 200, can read but cannot write to a second zone (Zone 2) 202, and cannot read or write to a third zone (Zone 3) 204. In one embodiment, an end user of the host system 110 may not be aware of the different zones or the inability to access restricted zones such as Zone 3. Dividing the NVM array 116 into different zones advantageously allows each zone to implement different vendor-specific commands including, but not limited to, commands that control access or security levels for a particular zone. Thus, vendor-specific commands such as a fast erasure of data command described in copending U.S. application Ser. No. 11/000,134, filed on Nov. 30, 2004, can be implemented on a zone-by-zone basis.

In one embodiment, a user defines zones (e.g., quantity, locations and sizes) to store various types of user and system data to meet individual requirements. The user also defines associated security and/or read/write access parameters for each zone. The security and/or read/write access parameters for each zone can be reset or changed without modifying the security and/or read/write access parameters of other zones (e.g., on a zone-by-zone basis). In other embodiments, the zone definitions or zone parameters are partially or fully defined during manufacturing or as part of an initialization process for a new solid-state storage subsystem 112. For example, a manufacturer limits the number of zones to no more than five in one embodiment of a solid-state storage subsystem 112.

Figure 3:
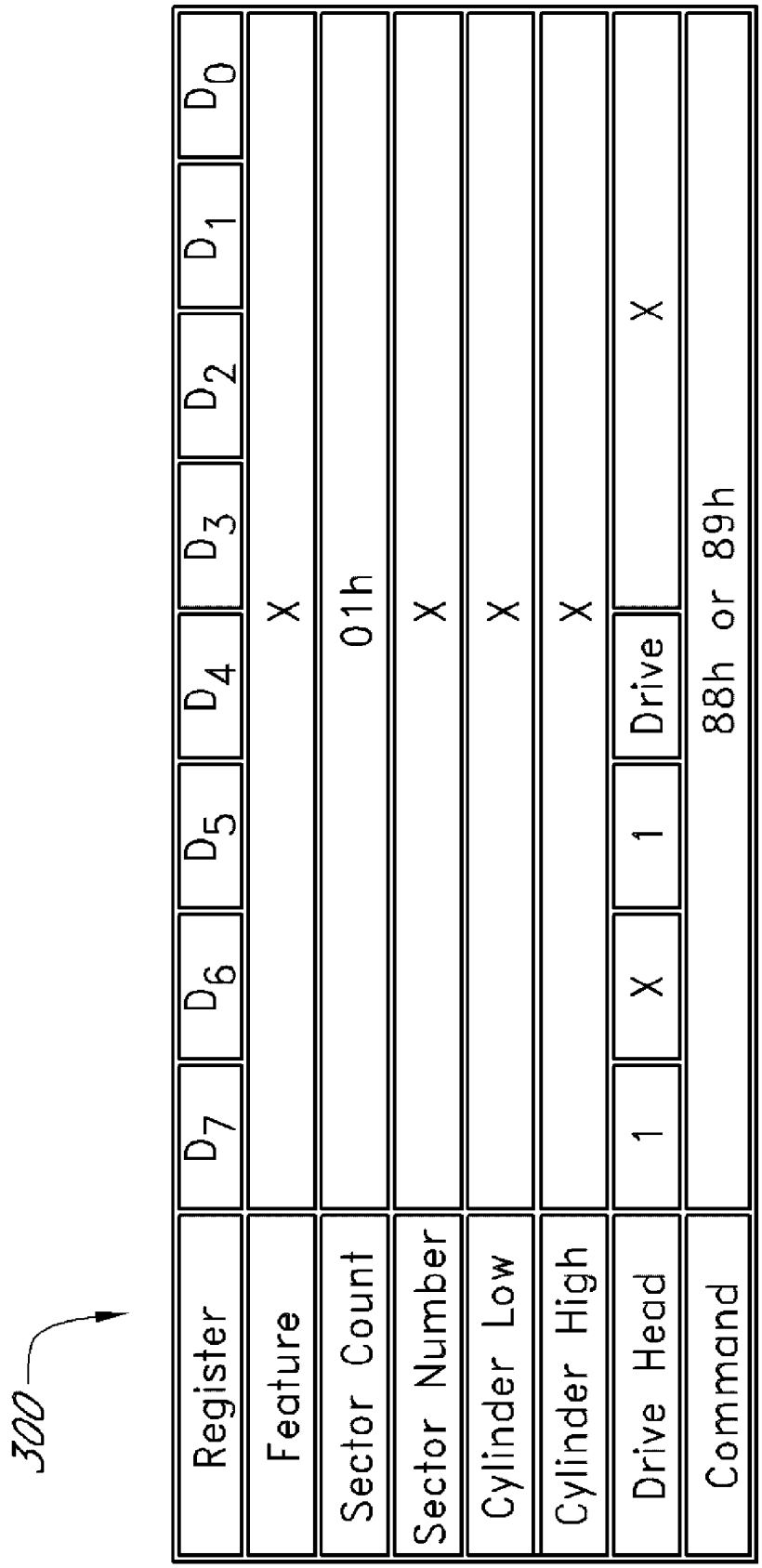
FIG. 3 illustrates an exemplary data structure for a define zones command or a read zones command according to one embodiment of the invention.

FIG. 3 illustrates an exemplary data structure 300 for a define/read zones command according to one embodiment of the invention. For example, the define zones command is a vendor-specific command for creating physical segments in a solid-state storage subsystem 112 using a standard disk drive protocol command such as, but not limited to, an ATA command. The read zones command is a vendor-specific command for retrieving information related to zone definitions or zone parameters. The define/read zones command include register fields to specify feature, sector count, sector number, cylinder low, cylinder high, drive head, and command information (e.g., 88h to define zones or 89h to read zones). In this example, each register field includes eight bits (e.g., $D_0$-$D_7$). An "X" indicates that the corresponding portion of the register field can have any value. In one embodiment, passwords in the solid-state storage subsystem 112 are cleared before execution of the define zones command.

In one embodiment, the host system 110 includes a host application represented in computer storage for generating the define/read zones command. The software may comprise, for example, a driver 113 configured to send a define zones command along with data comprising zone definitions and/or zone parameters to the controller 114. In one embodiment, the zones of the NVM array 116 are defined by a series of physical block addresses (PBAs). In an alternate embodiment, the zones are defined by logical block addresses (LBAs) or cylinder-head-sector (CHS) addresses. Each zone can be defined to have different security and/or read/write access modes. For example, a user can gain access to each zone through a password that is common to all zones or specific to particular zones.

In one embodiment, a user defines how each zone is accessed as part of an initial setup. The user uses a series of vendor-specific commands to define the number of zones, size of each zone (e.g., beginning and ending PBAs), passwords, and security features for each zone (e.g., full read and write access, read-only access, no access without password, etc.). Each zone may have different storage capacity (e.g., sizes), but the combination of the zones do not exceed the storage capacity of NVM array 116. In one embodiment, portions of the NVM array 116 that do not belong to any zone are used by the system 110 as unrestricted memory or as a spare or scratchpad area.

In one embodiment, one of the zones is defined as a master zone (e.g., Zone 0) to facilitate efficient reconfiguration of other currently defined zones. For example, the user may wish to change the parameters of one or more selected zones. Data or applications, however, are not normally directed for storage in the master zone. The master zone expands to include the selected zones, effectively overriding the parameters of the selected zones. In other words, a define zones command is used to expand the master zone into a selected zone to remove the selected zone's parameters (e.g., read/write access modes), but the data stored in the selected zone is otherwise unchanged (e.g., not deleted).

FIG. 4 illustrates an exemplary data structure 400 for zone definitions or PBAs associated with the define zones command. For example, 512 bytes are used to transmit or store beginning and ending PBAs of each zone in a solid-state storage subsystem 112 with a limit of five zones. Byte numbers 0-3 store the beginning PBA of Zone 1. Byte numbers 4-7 store the ending PBA of Zone 1. Byte numbers 32-35 store the beginning PBA of Zone 2. Byte numbers 36-39 store the ending PBA of Zone 2. Byte numbers 64-67 store the beginning PBA of Zone 3. Byte numbers 68-71 store the ending PBA of Zone 3. Byte numbers 96-99 store the beginning PBA of Zone 4. Byte numbers 100-103 store the ending PBA of Zone 4. Byte numbers 128-131 store the beginning PBA of Zone 5. Byte numbers 132-135 store the ending PBA of Zone 5. In one embodiment, a predefined word or address (e.g., 0xFFFFFFFFh) is stored as the beginning or ending PBA for an unused zone.

The beginning PBA and the ending PBA determines the location and size of a particular zone in the NVM array 116. The number of zones is not limited to five as shown in FIG. 4, but can be an arbitrary number determined by the manufacturer or user. Alternate methods can be used to define the number, location, and size of zones in use. For example, a user can define zones by providing a beginning PBA and a desired zone size. In one embodiment, the various zones do not overlap (e.g., any one location on the NVM array 116 does not belong to more than one zone).

As described above in connection with FIG. 3, a read zones command is substantially similar to a define zones command. In one embodiment, the read zones command is used by the host system 110 to read zone definitions stored in a solid-state storage subsystem 112. For example, the controller 114 provides the sequence of PBAs in the exemplary data structure 400 to the host system 110 in response to the read zones command. The host system 110 can use the zone definitions to determine that the zones do not overlap or that the zones do not exceed the capacity of the solid-state storage subsystem 112 (e.g., the ending PBA of the last zone is less than or equal to the last PBA of the NVM array 116). Alternately, the controller 114 can monitor the zones for overlap or excess capacity.

The solid-state storage subsystem 112 with physical segments (or zones) described above has many advantages. Each zone can be associated with different security and access parameters. The security and access parameters of one zone can be altered without affecting the parameters of another zone. New zones can be added or defined without affecting the previously defined zones. Critical system files, as defined by the user, can be stored in read-only zones to protect them from inadvertent overwrite. Data in one or more zones can be quickly erased while data in other zones remain unchanged. A user can define a zone to lock a Master Boot Record (MBR) or to protect other critical information to prevent inadvertent overwrite that would render the solid-state storage subsystem 112 useless. The user or host computer can define a variety of zones to better match individual usage of the solid-state storage subsystem 112. For example, the host computer can define zones that match segment definitions read from the MBR. In one embodiment, the solid-state storage subsystem 112 can be reused without re-partition using an industry-standard command such as, but not limited to, a Format command. For example, segment definitions and parameters are not stored in user data space and thus are not affected by operating system or file commands.

The solid-stage storage subsystem 112 with physical segments has many useful applications, especially applications that include a combination of data logging and static database. For example, a random number generator and a game program can be stored in one or two read-only zones of a memory array in a video poker machine while player tracking and other information are written to other zones. In a military data recorder, setup files can be stored in one zone while the mission data is stored in another zone. The mission data can be quickly erased to allow for shorter mission debriefings. Other applications include a voting machine that stores votes in a user data zone while recording the number of votes in a critical files zone not generally available to a user. The number of votes recorded in the critical file zone is usable to check for data corruption in the user data zone. Other configurations maintain ballot information in a read-only zone and validation codes in a password-protected zone.

In one embodiment, the ability to create segments in the solid-state storage subsystem 112 advantageously allows one solid-state storage subsystem to replace many different storage subsystems with a common host. For example, a video poker machine typically uses a secure EPROM to store validation codes required by regulatory agencies, a CD-ROM or DVD for read-only access to the game and associated graphic images, and a flash card to store player tracking statistics that is useful for casino marketing programs. A solid-state storage subsystem with three or more segments (or zones) can be used to replace the EPROM, CD-ROM or DVD, and flashcard. For example, a password-protected zone is used for validation codes, a read-only zone is used for the game, and a full read and write access zone is used for playing tracking.

While certain embodiments of the inventions have been described, these embodiments have been presented by way of example only, and are not intended to limit the scope of the inventions. For example, while some of the above embodiments have been described with reference to solid-state storage subsystems, the invention also applies to other types of storage subsystems such as hard disk drives and hybrid disk drives. Indeed, the novel methods and systems described herein may be embodied in a variety of other forms. Furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

What is claimed is:

1. A computer system comprising:
   a memory storage device comprising:
      a memory array configured to store user data;
      a set of zone definitions configured to divide the memory array into multiple physical segments;
      a set of zone parameters configured to define at least one of user access control and security control for each of the physical segments; and
      a controller configured to access the memory array, the set of zone definitions and the set of zone parameters; and
   a host system configured to access the memory array in accordance with the set of zone definitions and the set of zone parameters, wherein the set of zone definitions and the set of zone parameters are not affected by operating system commands or file commands used by the host system to access the memory array.

2. The computer system of claim 1, wherein the memory storage device is detachable from the host system.

3. The computer system of claim 1, wherein the set of zone parameters comprises a set of master zone parameters that override other zone parameters.

4. A storage device comprising:
   a non-volatile memory array configured to store applications or data that are accessible by operating system commands or file commands;
   a set of zone definitions comprising a plurality of addresses associated with the non-volatile memory array, wherein the set of zone definitions are changeable by vendor-specific commands and are configured to divide the non-volatile memory array into a plurality of segments;
   a set of zone parameters configured to define a plurality of access levels, wherein each of the segments is associated with an access level; and
   a controller configured to access the zone definitions and the zone parameters, wherein access by a host system to a particular location of the non-volatile memory array is permitted if the access is consistent with the set of zone definitions and the set of zone parameters.

5. The storage device of claim 4, wherein the plurality of access levels include a read-only and a password-protected access level.

6. The storage device of claim 5, wherein a password for the password-protected access level is common to two or more of the segments or specific to particular one of the segments.

7. The storage device of claim 4, wherein the controller is further configured to communicate with the host system over an interface such that the set of zone definitions and the set of zone parameters are provided to the host system to determine whether access by the host system to the particular location of the non-volatile memory array is consistent with the set of zone definitions and the set of zone parameters.

8. The storage device of claim 4, wherein the controller executes an algorithm to determine whether access by the host system to the particular location of the non-volatile memory array is consistent with the set of zone definitions and the set of zone parameters.

9. The storage device of claim 4, wherein the controller comprises firmware that determines whether access by the host system to the particular location of the non-volatile memory array is consistent with the set of zone definitions and the set of zone parameters.

10. The storage device of claim 4, wherein the number of segments is predefined by a manufacturer of the storage device and the set of zone definitions is changeable by a user to define sizes of the segments.

11. The storage device of claim 4, wherein the set of zone parameters comprises a set of master zone parameters that override other zone parameters.

12. A method to segment a non-volatile memory array on a storage subsystem, the method comprising:
- using a series of physical block addresses to define a plurality of physical segments in the non-volatile memory array, wherein the physical block addresses are not accessible by operating system commands or file commands of a host system;
- defining segment parameters for each of the physical segments, wherein the segment parameters comprise user access level properties and security level properties; and
- providing the series of physical block addresses and the segment parameters to a controller such that access to a particular location of the non-volatile memory array is permitted if the access is consistent with the segment parameters for that particular location.

13. The method of claim 12, wherein the series of physical block addresses are stored in registers that are part of the controller.

14. The method of claim 12, wherein the series of physical block addresses are stored on the storage subsystem in a separate location from the non-volatile memory array and the controller.

15. The method of claim 12, wherein the segment parameters are stored in the non-volatile memory array outside of a user data space.

16. The method of claim 12, wherein the segment parameters are stored on the storage subsystem in a separate location from the non-volatile memory array and the controller.

17. The method of claim 12, wherein the controller allows unrestricted access to portions of the non-volatile memory array that do not belong to any of the physical segments.

18. A method to access a segmented non-volatile memory array on a storage subsystem, the method comprising:
- retrieving a set of segment definitions stored in the storage subsystem outside the segmented non-volatile memory array, wherein the set of segment definitions defines a number of segments in the segmented non-volatile memory array and respective sizes of the segments;
- retrieving a set of segment parameters stored in the storage subsystem outside the segmented non-volatile memory array, wherein the set of segment parameters defines a plurality of access levels; and
- storing or retrieving data in the segmented non-volatile memory array in accordance with the set of segment definitions and the set of segment parameters.

19. The method of claim 18, wherein the segments do not overlap each other and a combination of the segments does not exceed a storage capacity of the storage subsystem.

20. The method of claim 18, wherein the set of segment definitions comprises a plurality of physical block addresses, and changing the plurality of physical block addresses changes the number of segments or the sizes of the segments without affecting information stored in the segmented non-volatile memory array.

* * * * *